United States Patent [19]
Yunoki

[11] Patent Number: 5,354,466
[45] Date of Patent: Oct. 11, 1994

[54] FILTRATION SYSTEM WITH IMPROVED BACKWASHING CAPABILITY

[75] Inventor: Toru Yunoki, Chigasaki, Japan

[73] Assignee: Millipore Corporation, Bedford, Mass.

[21] Appl. No.: 122,863

[22] Filed: Sep. 15, 1993

[30] Foreign Application Priority Data

Sep. 16, 1992 [JP] Japan .................. 4-270728

[51] Int. Cl.$^5$ .............................. B01D 63/00
[52] U.S. Cl. ................... 210/321.69; 210/108; 210/116; 210/117; 210/195.2; 210/333.01; 210/333.1
[58] Field of Search .............. 210/321.69, 108, 116, 210/117, 636, 791, 195.2, 257.2, 333.01, 333.1

[56] References Cited

U.S. PATENT DOCUMENTS

| | | | |
|---|---|---|---|
| 4,002,567 | 1/1977 | Konno et al. | 210/330.01 |
| 4,614,581 | 9/1986 | Drori | 210/108 |
| 4,670,150 | 6/1987 | Hsiung et al. | 210/636 |
| 4,736,671 | 4/1988 | Drori | 210/108 |
| 5,252,218 | 10/1993 | Muraldihara et al. | 210/321.69 |

FOREIGN PATENT DOCUMENTS 1724338  4/1992  U.S.S.R. .............. 210/321.69

*Primary Examiner*—Robert A. Dawson
*Assistant Examiner*—Ana M. Fortuna
*Attorney, Agent, or Firm*—Andrew T. Karnakis; Paul J. Cook

[57] ABSTRACT

A filtration system is disclosed which operates with a single supply pump to achieve backwashing in an expeditious manner. The system includes a fluid supply source for a feed fluid to be filtered, a feed pump in fluid communication with the source and a membrane filter module for separating the fluid into filtrate and retentate streams. A collection reservoir is also provided which has at least two isolated fluid compartments movably separated from one another, one compartment for accumulating filtrate, the other being in fluid communication with the supply pump. In a preferred embodiment the collection reservoir is in the form of a diaphragm unit. At appropriate times, valves are activated to divert the flow of feed material from the supply source to the other chamber of the diaphragm unit. At the same time, flow in the effluent conduit is restricted by suitable means such as a valve, restrictor, pumps or the like, thereby forcing the fluid in the filtrate chamber back through the filtrate conduit to the "underside" of the membrane filter. The resultant pressure creates a back pulse which backwashes the filtration surface of the membrane to remove particular matter thereon.

2 Claims, 2 Drawing Sheets

FILTRATION SYSTEM WITH IMPROVED BACKWASHING CAPABILITY

BACKGROUND OF THE INVENTION

This invention relates generally to a method and apparatus for improving filtration efficiency. More specifically, this invention relates to a method and apparatus for back pulsing membrane filters to remove the concentration of particulate matter on the filtration surface of such filters.

The need for cleaning the surface of a membrane filter upon which has been accumulated particular matter of various types contained within the fluid to be filtered has been long recognized in the filtration art. This technique is known as "backwashing". For example, in filtration applications that involve backwashing with the filtrate at given intervals, it has been proposed to use two supply means (e.g. pumps) as shown in the representation of FIG. 1. With two-way valves V1 and V2 kept open and a two-way valve V3 closed, a feed material to be filtered is supplied by a supply means such as pump P1 for filtration. The filtration membrane divides the feed into two treated streams, which are conducted via a concentrated solution outlet line "a" and a recovered filtrate line "b".

The filtrate is diverted back at given intervals to the filtration membrane for cleaning or "backwashing". The backwashing is accomplished when necessary for a given time period in the manner known to those of skill in the art, e.g., by closing the two-way valves V1 and V2 and opening the valve V3 and then forcing the filtrate by a second supply means P2 through a backflow supply line "c" and the two-way valve V3. In this connection, Japanese Patent Application Public Disclosure No. 256425/1992 reveals an example of filtration where the supply means P2 uses a compressed gas.

It has been determined that in the filtration process frequent backwashing with a small fluid supply is more effective than less frequent backwashing with a larger supply. One method of performing such frequent flow reversing is to use a centrifugal pump and to open and close valves at short intervals. However, presently there is no centrifugal pump commercially available which is suitable for small-scale operations. If manufactured specifically for such an operation, the pump would not be acceptable because it usually involves difficulties in flow rate control.

On the other hand, while use of a positive displacement pump is desirable in that it permits control of flow rate with ease and is commercially available for small-scale applications, frequent, intermittent running of such a pump is not advisable from the viewpoint of maintenance. Therefore, two pumps are usually combined with bypass lines, and solenoid-operated valves are intermittently opened and closed in response to signals from a timer, thereby performing intermittent flow reversing. However, continuous operation of two pumps is undesirable because both pumps can be simultaneously degraded in performance from wear or other reasons.

One way of overcoming the foregoing difficulties of the prior art is to adopt pneumatic equipment which drives the liquid. The tank for receiving the liquid for flow reversing is required to be pressure-resistant, and valves are indispensable for pressure application and evacuation. An air compressor is also necessary. These components make the noise reduction of the equipment difficult. In addition, frequent fixed-volume flow reversing can hardly be attained because the gas has greater compressibility than the liquid.

Thus the afore-described filtration systems of the prior art require two pumps, or a pressure vessel and pneumatic equipment or the like and their systematic interconnection to realize the flow reversing necessary for backwashing. For these reasons the overall volume or floor space the whole equipment occupies is significant, and this configuration is not efficient and compact in design or construction. The discovery of a more desirable method and the concomitant development of equipment that will simplify the filtration system to accommodate backwashing would be highly desirable.

SUMMARY OF THE INVENTION

The foregoing disadvantages and limitations of the prior art are overcome by the present invention in which a filtration system is configured to operate with a single supply pump to achieve backwashing in an expeditious manner. The system includes a fluid supply source for a feed fluid to be filtered, a feed pump in fluid communication with the source and a membrane filter module for separating the fluid into filtrate and retentate streams. A collection reservoir is also provided which has at least two isolated fluid compartments movably separated from one another, one compartment for accumulating filtrate, the other being in fluid communication with the supply pump. In a preferred embodiment the collection reservoir is in the form of a diaphragm unit.

In a specific embodiment, the filtrate from the membrane filter is fed by a conduit to one chamber of the diaphragm unit. An effluent conduit is also provided which is in fluid communication with the filtrate chamber of the diaphragm. At appropriate times, valves are activated to divert the flow of feed material from the source to the other chamber of the diaphragm unit. At the same time, flow in the effluent conduit is restricted by suitable means such as a valve, restrictor, pumps or the like, thereby forcing the liquid inn the filtrate chamber back through the filtrate conduit to the "underside" of the membrane filter. The resultant pressure creates a back pulse which backwashes the filtration surface of the membrane to remove particulate matter thereon.

The preferred diaphragm unit includes a diaphragm formed of a material chosen to be fully deformable and arranged to separate the interior chamber of the unit into two sub-chambers, fully isolated from one another. The diaphragm is fully deformed by the application of fluid from the feed pump and capable of transmitting the driving force to the sub-chamber housing filtrate fluid as provided on the opposite (i.e. driven) side of the diaphragm. The driven side is connected via a conduit to the filtrate side of the filtration operation. The fluid is discharged from this reservoir in proportion to the deformation of the diaphragm into the filtrate chamber. Once backwashing has been accomplished the diaphragm is returned to its original state to be ready for the next supply of the same fluid. For this to occur, the pressure against the diaphragm must be released and the filtrate fluid must be refilled into the reservoir. In the preferred embodiment, the diversion of flows and resultant pressures is accomplished by suitable valving arrangements.

DESCRIPTION OF PREFERRED EMBODIMENTS

Figure 1:
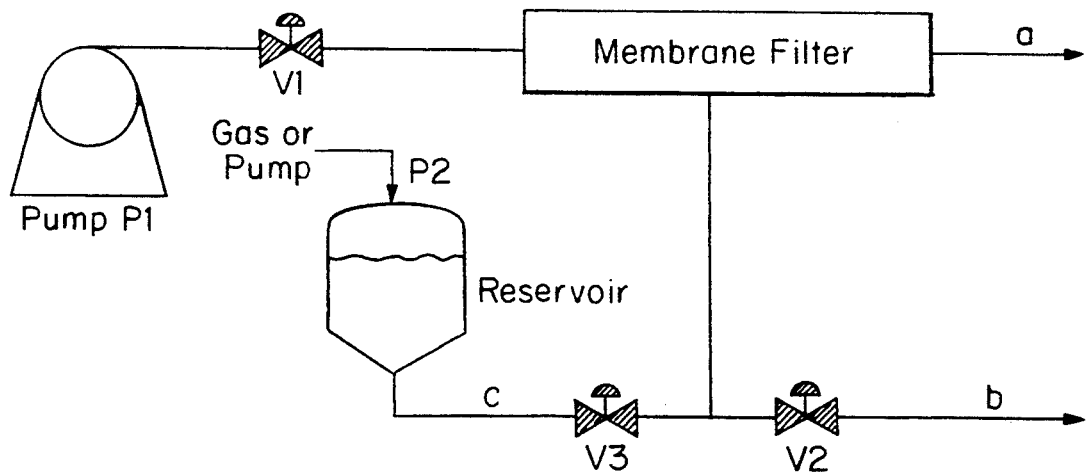
FIG. 1 is a block diagram of a filtration system utilizing back pulsing techniques in accordance with the prior art.
Figure 2:
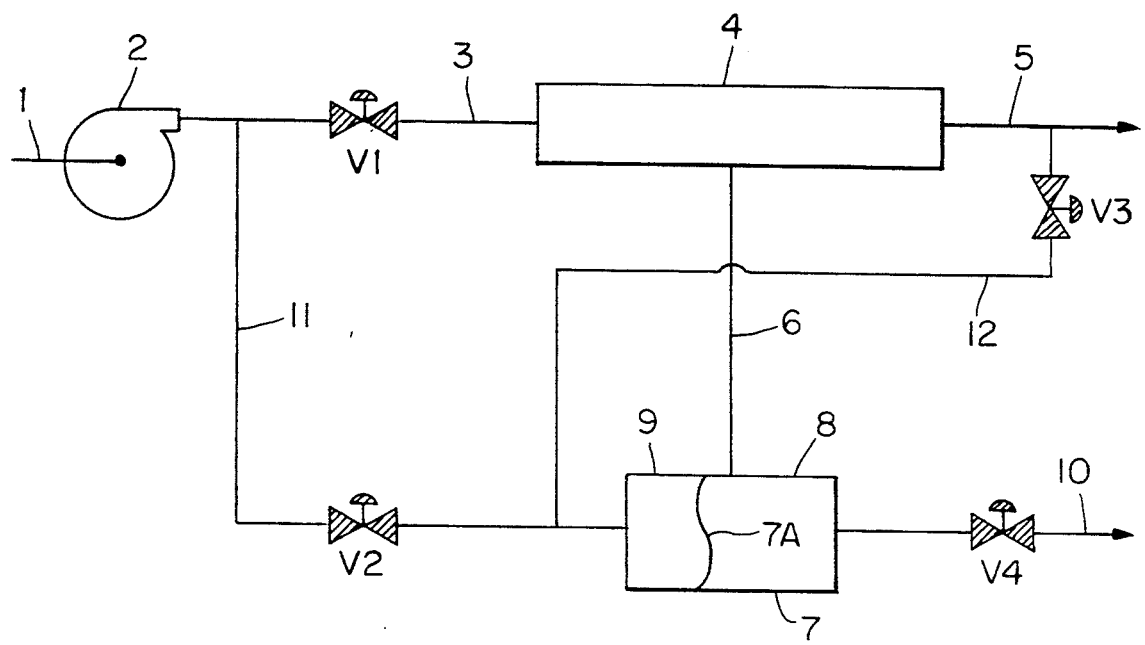
FIG. 2 is a block diagram of a filtration system utilizing back pulsing techniques in accordance with present invention.

FIG. 2 shows a filtration system for providing backwashing of a filtration module. The system includes a feed supply 1 of a liquid to be filtered which is driven by a high pressure feed pump 2 through a feed conduit 3 and valve V1 to a membrane filtration module 4. This module comprises a porous membrane filter which is intended to include polymeric membrane filters of microfiltration, ultrafiltration and reverse osmosis types, ceramic and metal filters of these classes, as well as related materials used in separation and purification applications.

The output of the filtration module 4 includes a retentate conduit 5 for carrying the unfiltered feed liquid and a filtrate conduit 6 for carrying the filtered feed liquid to a collection reservoir 7. The reservoir is separated into two chambers by a movable diaphragm 7A. A filtrate chamber 8 collects filtrate and a feed chamber 9 connects to the pump output to transmit pressure to the filtrate chamber.

The feed conduit branches at the upstream side of valve V1 and joins the feed chamber 9 via valve V2. The filtrate conduit 6 joins the filtrate chamber 8. The downstream side of valve V2 branches and joins the retentate conduit 5 via valve V3. Alternatively, the downstream side of valve V2 could be connected to feed supply 1 via valve V3. The filtrate chamber is connected to the effluent conduit 10 via valve V4.

During filtration, valves V2 and V3 are closed and valves V1 and V4 are open. The retentate flows to a retentate tank (not shown) via the retentate conduit 5. The filtrate flows into a filtrate tank (not shown) via the filtrate line 6 and the effluent conduit 10. During backwashing, valves V1, V3 and V4 are closed, and valve V2 is opened. The pressure of the pump 2 transmits to the filtrate chamber 8 via the feed chamber 9. The liquid contained in the filtrate chamber is displaced, backwashes the membrane, and exits via the retentate conduit 5. The closing of valve V2 and opening of valves V1, V3 and V4 relieves the pressure on the feed chamber and allows the system to resume the filtration mode.

Referring to the operation of the system in a filtration mode, the incorporation of valves is desirable, although not essential, to accomplish the flow reversing for switching the liquid feed 1 to pressurize the filtrate chamber 8 for backwashing the membrane module 4. For example, similar results could be achieved through use of restrictors, pumps or other similar means. In this embodiment, either two two-way valves (e.g. V1 and V2) or a three-way valve can be provided for the lines that have branched from the delivery side of the pump 2 to the feed chamber 9 of the collection reservoir 7. During backwashing, the collection reservoir must be supplied with filtrate at a pressure high enough to overcome the pressure drop that takes place across the membrane filter. To this end, it is desirable to install a downstream cut-off valve (e.g. V4) which shuts off a downstream portion of the effluent conduit 10 and increases the pressure of the filtrate for backwashing.

Figure 3:
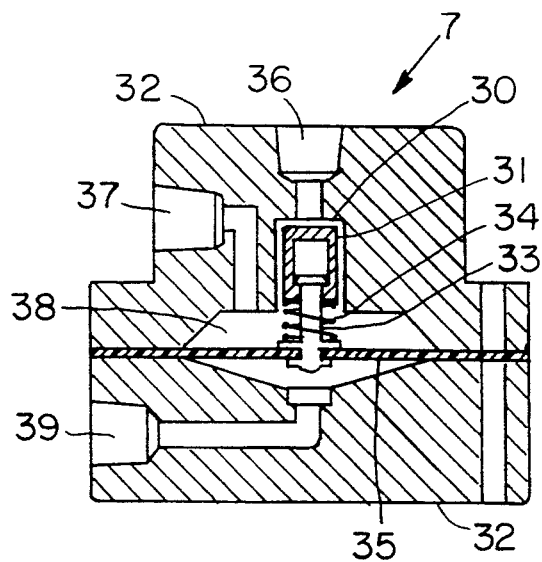
FIG. 3 is a cross sectional view of a collection reservoir in accordance with a preferred embodiment.

Further details of the collection reservoir 7 are shown in FIG. 3 which shows in its simplest form the implementation of shifting the operation of the liquid supply pump 2 from supplying liquid (the feed) to be filtered by the membrane to supplying another fluid (the filtrate) for backwashing or vice versa by mere switching of valves while the supply pump is running continuously in accordance with the embodiment of FIG. 2.

The unit comprises two blocks 32 sandwiching a diaphragm 35 therebetween, one of the blocks having a diaphragm body flow passage formed on the driven side of the diaphragm and starting with an inlet 37 and extending through a reservoir 38 to an outlet 36. The other block includes a diaphragm driving flow passage 39 formed on the pressure receiving side of the diaphragm, a shaft 33 secured at one end to the diaphragm 35 and extending toward the reservoir 38, a valve body 31 attached to the other end of the shaft 33 capable of coming in liquid-tight contact with a valve seat 30 provided in the diaphragm body flow passage. The valve body has a space through which the shaft 33 is movable axially in a reciprocating motion, and a spring 34, spirally coiled round the shaft 33 between the valve body 31 and the first diaphragm. Thus, in filtration, the filtrate flows from the inlet 37 through the reservoir 38 to the passage 36 and then is led to a filtrate storage tank (not shown) for recovery. During backwashing, the driving force of the supply pump is transmitted to the passage 39 for driving the diaphragm 35. The diaphragm 35 is thus urged upward, pressing the valve body 31 with the aid of the spring 34 against the valve seat 30 thereby choking off the flow of the filtrate out of the passage 36. As the driving force is further transmitted, the diaphragm 35 forces the liquid in the reservoir 38 backward toward the inlet 37 for the backwashing of the module. This arrangement obviates the need for valve V4. As long as the driving force is transmitted via the passage 39 to operate the diaphragm 35, backwashing is accomplished within the range not exceeding the capacity of the reservoir 38.

Figure 4:
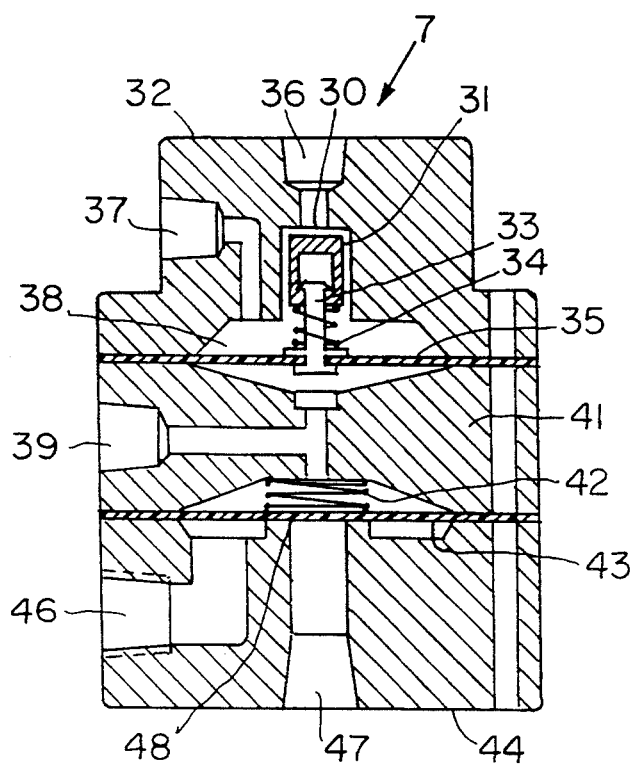
FIG. 4 is a cross sectional view of another preferred embodiment of a collection reservoir.

FIG. 4 shows an example of still another embodiment of the collection reservoir 7. This unit is similar to that shown in FIG. 3 except that it is combined with a directional control diaphragm valve located on the spring-loaded diaphragm side. The additional diaphragm valve consist of an additional diaphragm 43 sandwiched between an intermediate block 41 and a valve block 44 and proceed by means of an additional spring 42 against an additional valve seat 48. For filtration, the explanation made above in conjunction with FIG. 3 applies. It may be added that the driving force from passage 39 during backwashing forces the diaphragm 43 downward until it is seated on the valve seat 48 against the urging of the spring 42. This acts to stop the flow from the inlet 46 to the outlet 47.

I claim:

1. A system for back pulsing membrane modules which comprises:
   a liquid supply source;
   a feed pump in fluid communication with the supply source;
   a membrane module receiving liquid from said pump through a feed conduit;

a retentate conduit receiving the unfiltered portion of the feed stream;

a filtrate conduit receiving filtrate from the membrane module;

said filtrate conduit is connected to a collection reservoir having at least two isolated liquid compartments movably separated from one another, a first compartment adapted for receiving and accumulating filtrate from said membrane module, a second compartment being connected through a conduit with said feed pump to receive fluid for driving said first compartment; means for diverting the liquid from the feed conduit into said conduit in communication with said second compartment;

an effluent conduit in fluid communication with said filtrate conduit and with said first compartment;

means for draining liquid from said second compartment; and means for reversing the flow of filtrate in said first chamber back into the membrane filtration module through the filtrate conduit.

2. The system of claim 1 wherein said compartments are separated by a movable diaphragm.

* * * * *

UNITED STATES PATENT AND TRADEMARK OFFICE
CERTIFICATE OF CORRECTION

PATENT NO. : 5,354,466
DATED : October 11, 1994
INVENTOR(S) : Toru Yunoki

It is certified that error appears in the above-indentified patent and that said Letters Patent is hereby corrected as shown below:

Title page: item [73] should read:

Assignee:   Nihon Millipore Kogyo
            Kabushiki Kaisha

Signed and Sealed this

Nineteenth Day of December, 1995

Attest:

Attesting Officer

BRUCE LEHMAN
Commissioner of Patents and Trademarks